United States Patent
Barsade et al.

(10) Patent No.: US 11,647,095 B1
(45) Date of Patent: May 9, 2023

(54) METHOD AND SYSTEM FOR ORCHESTRATING COMMUNICATIONS BETWEEN APPLICATION SERVICES THROUGH A UNIFIED CONNECTOR PLATFORM

(71) Applicant: INTUIT INC., Mountain View, CA (US)

(72) Inventors: Jonathan Barsade, Wynnewood, PA (US); Todd Suzanski, Miami, FL (US)

(73) Assignee: INTUIT INC., Mountain View, CA (US)

( * ) Notice: Subject to any disclaimer, the term of this patent is extended or adjusted under 35 U.S.C. 154(b) by 432 days.

(21) Appl. No.: 16/150,203

(22) Filed: Oct. 2, 2018

(51) Int. Cl.
  *H04L 67/565* (2022.01)
  *G06F 16/957* (2019.01)
  *H04L 67/60* (2022.01)

(52) U.S. Cl.
  CPC ........ *H04L 67/565* (2022.05); *G06F 16/9574* (2019.01); *H04L 67/60* (2022.05)

(58) Field of Classification Search
  CPC .. H04L 67/2823; H04L 67/32; G06F 16/9574
  See application file for complete search history.

(56) References Cited

U.S. PATENT DOCUMENTS

| | | | | |
|---|---|---|---|---|
| 5,392,390 A | * | 2/1995 | Crozier | G06F 15/0208 715/751 |
| 5,557,798 A | * | 9/1996 | Skeen | G06F 9/542 709/215 |
| 5,708,828 A | * | 1/1998 | Coleman | H04L 29/06 715/205 |
| 5,845,283 A | * | 12/1998 | Williams | G06F 16/258 |
| 6,151,608 A | * | 11/2000 | Abrams | G06F 16/214 707/679 |

(Continued)

FOREIGN PATENT DOCUMENTS

| | | | | |
|---|---|---|---|---|
| CA | 2624436 A1 | * | 4/2007 | ............ G06F 16/10 |
| WO | WO-9637817 A1 | * | 11/1996 | ............ H04L 29/06 |

(Continued)

OTHER PUBLICATIONS

Integrating Systems Through Universal Transformation Using IBM WebSphere Transformation Extender, IBM Redbooks (Year: 2009).*

*Primary Examiner* — Emmanuel L Moise
*Assistant Examiner* — Robert A Shaw
(74) *Attorney, Agent, or Firm* — Patterson + Sheridan, LLP

(57) ABSTRACT

Certain aspects of the present disclosure provide techniques for orchestrating communications between different application services through a unified connector platform. Embodiments include receiving, via a connector between a first system and a connector platform, a request to pull a specified data set from one or more second systems. The specified data set is obtained from each of the one or more second systems via a connector between each of the one or more second systems and the connector platform. For each of the obtained data sets, intermediary data sets are generated by converting the obtained data set to a common data format, and a result data set is generated by converting the intermediary data sets are converted to a format associated with the first system. The result data set is transmitted to the first system via the connector between the first system and the connector platform.

20 Claims, 6 Drawing Sheets

(56) References Cited

U.S. PATENT DOCUMENTS

| | | | | |
|---|---|---|---|---|
| 6,208,345 | B1* | 3/2001 | Sheard | G06F 40/151 715/853 |
| 6,216,131 | B1* | 4/2001 | Liu | G06F 16/258 |
| 7,231,433 | B1* | 6/2007 | Hellbusch | G06Q 10/10 707/999.104 |
| 8,812,482 | B1* | 8/2014 | Kapoor | G06F 16/273 707/713 |
| 9,405,814 | B1* | 8/2016 | Kapoor | G06F 16/256 |
| 9,922,104 | B1* | 3/2018 | Kapoor | H04L 67/10 |
| 2001/0039540 | A1* | 11/2001 | Hofmann | H04L 67/04 |
| 2002/0029227 | A1* | 3/2002 | Multer | G06F 16/182 |
| 2002/0073236 | A1* | 6/2002 | Helgeson | G06F 16/258 709/217 |
| 2002/0143819 | A1* | 10/2002 | Han | G06F 16/958 715/237 |
| 2004/0015366 | A1* | 1/2004 | Wiseman | G06F 16/258 705/1.1 |
| 2004/0107201 | A1* | 6/2004 | Morris | G06F 16/258 |
| 2004/0181753 | A1* | 9/2004 | Michaelides | G06F 16/258 715/249 |
| 2004/0186842 | A1* | 9/2004 | Wesemann | G06F 16/1794 |
| 2005/0044197 | A1* | 2/2005 | Lai | H04L 67/16 709/223 |
| 2005/0050555 | A1* | 3/2005 | Exley | G06F 9/541 719/328 |
| 2005/0149484 | A1* | 7/2005 | Fox | G06F 16/84 |
| 2005/0256923 | A1* | 11/2005 | Adachi | G06F 16/9577 707/E17.121 |
| 2005/0262192 | A1* | 11/2005 | Mamou | G06Q 10/10 709/203 |
| 2006/0251125 | A1* | 11/2006 | Goring | H04L 67/26 370/503 |
| 2006/0259909 | A1* | 11/2006 | Passero | G06F 16/88 719/312 |
| 2008/0120129 | A1* | 5/2008 | Seubert | G06Q 40/125 705/305 |
| 2008/0140857 | A1* | 6/2008 | Conner | G06Q 50/10 709/236 |
| 2008/0216052 | A1* | 9/2008 | Hejlsberg | G06F 9/44 717/114 |
| 2008/0235255 | A1* | 9/2008 | Greer | G06F 16/252 |
| 2009/0313311 | A1* | 12/2009 | Hoffmann | G06F 11/2097 |
| 2011/0119233 | A1* | 5/2011 | Reddy | H01L 21/31116 707/624 |
| 2011/0269424 | A1* | 11/2011 | Multer | H04L 67/1095 455/411 |
| 2012/0173615 | A1* | 7/2012 | Greer | H04L 63/101 709/203 |
| 2013/0031085 | A1* | 1/2013 | Wang | G06F 16/8365 707/718 |
| 2014/0156843 | A1* | 6/2014 | Childs | H04L 67/34 709/225 |
| 2014/0280254 | A1* | 9/2014 | Feichtner | G06K 9/6253 707/755 |
| 2014/0282623 | A1* | 9/2014 | Conover | G06F 9/542 719/318 |
| 2014/0337345 | A1* | 11/2014 | Motoyama | G06F 3/0638 707/738 |
| 2015/0134681 | A1* | 5/2015 | Burne | G06F 16/972 707/756 |
| 2015/0201014 | A1* | 7/2015 | Clark | H04L 67/02 709/248 |
| 2017/0006135 | A1* | 1/2017 | Siebel | G06N 20/00 |
| 2017/0048079 | A1* | 2/2017 | Nethi | H04L 12/2836 |
| 2017/0060974 | A1* | 3/2017 | Dudhani | G06F 16/258 |
| 2017/0085447 | A1* | 3/2017 | Chen | H04L 43/024 |
| 2018/0063290 | A1* | 3/2018 | Yang | H04L 41/0266 |
| 2018/0374050 | A1* | 12/2018 | Murari | H04L 67/2838 |
| 2019/0141006 | A1* | 5/2019 | Schnitt | G06F 9/44505 |
| 2019/0370028 | A1* | 12/2019 | Shi | G06F 9/5088 |

FOREIGN PATENT DOCUMENTS

| | | | | |
|---|---|---|---|---|
| WO | WO-2005114395 | A1 * | 12/2005 | G06F 16/9577 |
| WO | WO-2006026673 | A2 * | 3/2006 | G06F 16/22 |
| WO | WO-2007042713 | A1 * | 4/2007 | G06F 9/5005 |
| WO | WO-2007044230 | A2 * | 4/2007 | G06F 16/10 |
| WO | WO-2014035936 | A2 * | 3/2014 | G06F 3/01 |
| WO | WO-2015021331 | A2 * | 2/2015 | G06F 16/972 |
| WO | WO-2016118979 | A2 * | 7/2016 | G06F 16/254 |

* cited by examiner

METHOD AND SYSTEM FOR ORCHESTRATING COMMUNICATIONS BETWEEN APPLICATION SERVICES THROUGH A UNIFIED CONNECTOR PLATFORM

INTRODUCTION

Aspects of the present disclosure generally relate to orchestrating communications between different application services, and more specifically to orchestrating data push and pull operations between application services using different data formats through a unified connector platform.

BACKGROUND

Applications executing on computing systems generally are configured to execute specific tasks. For example, in a financial application environment, some applications may be configured to generate transaction rules that a transaction processing application is to use in processing transactions, some applications may be configured to process transactions and store processed transactions in a transaction repository, still further applications may be configured to use transaction history information for accounting and tax preparation purposes, and so on. Each of these applications may consume and expose data in unique formats specific to that application. These applications may pull data from a source application by requesting specified data from the source applications or push data to a target application.

To facilitate data transfer operations (e.g., data push and pull operations) between different applications, applications may expose application programming interface (API) functions for transferring data from one application to another application. These API functions may include functions for requesting data from another application (e.g., initiating a data pull request), receiving data from another application (e.g., receiving data pushed from another application asynchronously), and transmitting data to another application. Because each application may expose an API with unique function names and expected data formats, connectors may be established for each pairing of applications to ensure that data is transmitted to a receiving application in the expected data format and using the API functions exposed by that application and that the receiving application invokes existent functions using the proper parameters defined for these functions. As applications are added, removed, or changed, connectors established for different pairings of applications may also need to be added, removed, or changed. For example, connectors may be changed to deprecate API function calls related to features no longer supported by an application, modify API function calls to reflect changes to function names and/or parameters, and the like.

Accordingly, techniques are needed to orchestrate communications between various applications.

BRIEF SUMMARY

Certain embodiments provide a method for orchestrating data transfer operations between multiple computing systems. The method generally includes receiving, from a first system via a connector between the first system and a connector platform, a request to pull a specified data set from one or more second systems. The specified data set, which is generally formatted according to a format associated with each of the one or more second systems, is obtained from each of the one or more second systems via a connector between each of the one or more second systems and the connector platform. For each of the obtained data sets, intermediary data sets are generated by converting the obtained data set from the format associated with the second system from which the obtained data set was obtained to a common data format, and the intermediary data sets are converted to a result data set from the common data format to a format associated with the first system. The result data set is transmitted to the first system via the connector between the first system and the connector platform, the result data set containing the specified data set in the format associated with the first system.

Other embodiments provide a system comprising a processor and a non-transitory computer readable medium that, when executed, causes the processor to perform an operation for orchestrating data transfer operations between multiple computing systems. The operation generally includes receiving, from a first system via a connector between the first system and a connector platform, a request to pull a specified data set from one or more second systems. The specified data set, which is generally formatted according to a format associated with each of the one or more second systems, is obtained from each of the one or more second systems via a connector between each of the one or more second systems and the connector platform. For each of the obtained data sets, intermediary data sets are generated by converting the obtained data set from the format associated with the second system from which the obtained data set was obtained to a common data format, and the intermediary data sets are converted to a result data set from the common data format to a format associated with the first system. The result data set is transmitted to the first system via the connector between the first system and the connector platform, the result data set containing the specified data set in the format associated with the first system.

Still further embodiments provide a computer-readable medium having instructions stored thereon which, when executed by a processor, performs an operation for orchestrating data transfer operations between multiple computing systems. The operation generally includes receiving, from a first system via a connector between the first system and a connector platform, a request to pull a specified data set from one or more second systems. The specified data set, which is generally formatted according to a format associated with each of the one or more second systems, is obtained from each of the one or more second systems via a connector between each of the one or more second systems and the connector platform. For each of the obtained data sets, intermediary data sets are generated by converting the obtained data set from the format associated with the second system from which the obtained data set was obtained to a common data format, and the intermediary data sets are converted to a result data set from the common data format to a format associated with the first system. The result data set is transmitted to the first system via the connector between the first system and the connector platform, the result data set containing the specified data set in the format associated with the first system.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
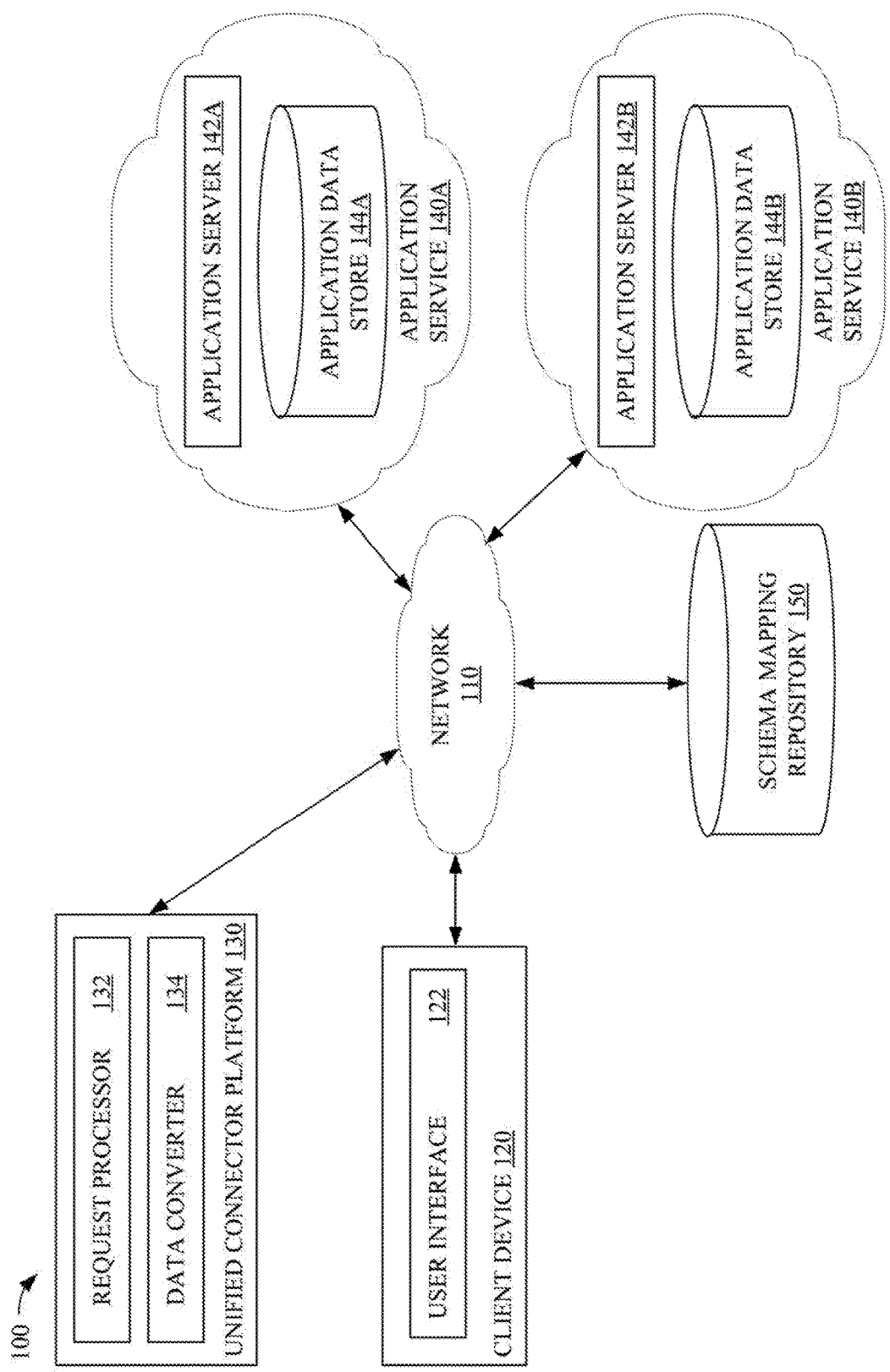
FIG. 1 depicts an example networked environment in which communications are orchestrated between application services via a unified connector platform.

Aspects of the present disclosure provide apparatuses, methods, processing systems, and computer readable mediums for orchestrating data transfer operations between computing resources on which different application services execute via a connector platform. The connector platform generally uses connectors between each of the application services and the connector platform to receive and transmit data to the application services, and uses mappings between application service-specific data formats and a common intermediary data format to facilitate data transfer operations between different application services. By using connectors between application services and the connector platform to perform communications between application services, communications between different application services may be performed without the use of dedicated connectors between application services. Communications between application services may be performed through a unified connector platform using translations to and from the common intermediary data format such that updates to any single application service need not entail updates to each connector associated with the updated application service.

Each application service may be associated with a mapping between the application-specific data format and data format and a connector used to facilitate communications between the application service and the connector platform. Each connector may be customized based on the granularity of data that an application service consumes, scheduling of requests by an application service, and the like. For example, connectors and data format mappings for an application service that consumes a single data point from a second application service may differ from connectors and data format mappings for an application service that consumes more detailed data from the second application service. In another example, connectors for an application service that requests data in real time may differ from connectors for an application service that periodically or aperiodically requests batch data from multiple other application services, and those connectors may further differ from connectors for an application service that receives data asynchronously (e.g., through push operations from another application service).

By orchestrating data sharing and data transfers between application services through a connector platform, data sharing and data transfers between different application services may be decoupled such that changes to the operation of a first application service (e.g., changes to application logic, API function names and expected parameters, and/or expected data formats) does not affect the functionality of each pairing of the first application service and other application services. Developers need not write and maintain custom connectors between different applications that consume different amounts of data, in different formats, and on different schedules. Connectors may be maintained between an application service and the common data platform so that the connector between a specific application service and the common data platform, but no other connectors, need be modified when the API and/or expected data formats for the specific application service change. Because connectors for different application services may be maintained independently, code duplication and code maintenance issues arising from the creation of custom connectors between each pair of applications may be reduced. Further, communications between a modified application service and other application services may be tested and deployed quickly and with a limited amount of testing, as changes to the functionality of one application service generally does not affect other application services.

Further, by orchestrating communications between different application services, data synchronization processes may be separated from core application logic (e.g., business logic for performing various functions in accounting, transaction processing, etc.). An application service may push and/or pull data to destination application services customized to the specificity of the data used by the destination application services. For example, a transaction boundary rule generation system may push transaction rules to any client application service (e.g., transaction processing systems) without requesting or transmitting only common information used across the client application services, or otherwise synchronizing data based on a lowest common denominator of any specific client application service. The transaction boundary rule generation system may receive requests for transaction rules with different levels of granularity (e.g., postal code (e.g., a ZIP code), extended postal code (e.g., ZIP+4), specific address, etc.) from different application services and provide the applicable transaction rules or a calculation based on the applicable transaction rules based on the data expected to be received by a specific requesting application service.

Additionally, orchestrating communications between different application services through a unified connector platform provides a single synchronization system that may provide more robust communications than those provided by dedicated connectors between different groups of applications. A common set of data synchronization code may be shared by the connectors between each application service and the unified connector platform, and metadata from each of the connectors may be shared to improve data synchronization processes across the various application services that communicate through the unified connector platform. Further, a dedicated system may handle the storage of application service metadata and synchronization processes, which may provide a single point at which connector code and data synchronization code may be maintained and updated over time.

Still further, orchestrating communications between different application services through a unified connector platform may provide for standardization, deduplication, merging, and data integrity in environments where multiple application services perform operations using data generated across the multiple application services. For example, in an environment including an accounting application and a plurality of transaction processing systems (e.g., different shopping carts in an e-commerce application), the accounting application may receive transaction information for recordation from each of the plurality of transaction processing systems. The unified connector platform may compare the data from each of the plurality of transaction processing systems to identify entries in data sets that are associated with the same transaction and reconcile the identified entries into a single, standardized entry associated with the transaction. Further, in scenarios where a transaction processing system may itself include a plurality of components that each processes part of a transaction, the unified connector platform may coordinate the transfer of transaction data across the plurality of components to ensure data integrity and thus, ensure that transactions are processed and recorded correctly. For example, in a scenario in which a transaction is processed by generating a sales order in a shopping cart application, generating invoices for the sales order in a separate invoicing and billing application, and coordination of back-end transaction information in an accounting application, a unified connector platform may orchestrate communications between each of these components to process the transaction, ensure data integrity as transaction data crosses through the unified connector platform to each of the different services, and record the correct transaction data.

Example Unified Connector Platform for Orchestrating Communications Between Application Services FIG. 1 illustrates a networked environment 100 in which communications between different application services are orchestrated through a unified connector platform, according to an embodiment. As illustrated, networked environment 100 includes a client device 120, unified connector platform 130, a plurality of application services 140, and a schema mapping repository 150, all connected via network 110. Though shown as a single network in FIG. 1, it is contemplated that any number of interconnected networks may allow connection between the various aspects of FIG. 1.

Client device 120 is generally representative of a variety of devices that can interact with unified connector platform 130 to configure unified connector platform 130 with mapping schemas and connectors between unified connector platform 130 and one or more application services 140, including, but not limited to, laptop computers, desktop computers, thin clients, tablet computers, mobile computing devices, and the like. As illustrated, client device 120 includes a user interface 122, which allows a user of client device 120 to interact with management functionality exposed by unified connector platform 130 (e.g., a command-line manager or a graphical management console), which further allows the user to manage the connectors and schema mappings deployed to unified connector platform 130 for orchestrating communications between different application services 140. In some embodiments, to manage connectors and schema mappings deployed to unified connector platform 130, a user of client device 120 can transmit connector source code and schema definition files to unified connector platform 130 to augment or overwrite existing connector source code and schema definition files. As discussed in further detail below, the connector source code may define a connector between an application service 140 and the unified connector platform 130, and need not provide a connector directly between different application services 140. In some embodiments, user interface 122 may additionally allow users to define, for example, a scheduling for data transfer operations to be performed between a first application service 140A and a second application service 140B.

Unified connector platform 130 generally provides an intermediary, or proxy service, that orchestrates communications between application services 140. Generally, unified connector platform 130 may be implemented as a service extrinsic to the application services 140 that communicate through unified connector platform 130 to perform one or more actions with data retrieved from other application services. As illustrated, unified connector platform 130 includes a request processor 132 and a data converter 134.

Request processor 132 generally is configured with connector modules for performing data transfer and retrieval operations between unified connector platform 130 and application services 140 (e.g., application service 140A, application service 140B, and other application services). The connector modules generally expose methods that an application service 140 can invoke to initiate a transfer of data to another application service and methods that unified connector platform 130 can invoke to satisfy data pull requests from an application service. In some embodiments, the connector modules can further expose functions for scheduling data transfers to specified application services through unified connector platform 130.

To satisfy a request to pull data from one or more application services 140, request processor 132 receives, via a connector between unified connector platform 130 and a requesting application service 140, a pull request identifying the data to be retrieved and the application services from which the data is to be retrieved. In response, request processor 132 can invoke data retrieval functions from the identified application services 140 through the connectors established between unified connector platform 130 and the identified application services 140 to retrieve the requested data from the identified application services 140. Request processor 132 receives data sets including the requested data from each of the identified application services in data formats associated with the respective application services. To convert the requested data to a format usable by the requesting application service, request processor 132 provides the received data sets to data converter 134 for conversion from formats associated with the respective application services from which the data sets were received to a format associated with the requesting application service, as discussed in further detail below. After receiving the converted data set from data converter 134, request processor 132 transmits the converted data set to the requesting application service 140.

In some embodiments, the request to pull data from one or more application services 140 may include a request to perform calculations based on a data set provided by the requesting application service or otherwise process a data set provided by the requesting application service. For example, a requesting application service 140A may be a transaction processing system that requests a sales tax calculation from a tax calculator service executing as application service 140B. The request for data transmitted by application service 140A may include, for example, information about the entity to be billed through the invoice and line items representing different goods or services billed in the invoice. Request processor 132 may invoke the appropriate functions exposed by application service 140B and provide the invoice information (e.g., the information about the entity to be billed and the one or more line items in the invoice) to obtain a calculated tax liability for the transaction, which may be returned as a single value.

In some embodiments, where an application service 140A performs calculations based on parameters provided by an application service 140B, the request to pull data from application service 140B may indicate the parameters that application service 140A needs to perform a calculation or otherwise successfully execute operations invoked by calling an API function exposing the operation on application service 140A. For example, in an example where application service 140A is a transaction processing system that performs sales tax calculations locally based on parameters provided by a transaction parameter provider executing as application service 140B, application service 140A may request transaction parameters applicable to the transaction from application service 140B through request processor 132. In response, rather than a single value representing the calculated tax liability for the transaction as discussed above, application service 140B may return, to request processor 132, information identifying the parameters to apply to the transaction. The information received from application service 140B may be received as a set of database records, a mapping between different pieces of data in the invoice and transaction properties to apply, or other information. Regardless of the format in which the data is received from application service 140B, the received data may be passed to data converter 134 to convert the received information to a format usable by application service 140A to calculate taxes applicable to the transaction.

In some embodiments, application service 140A may transmit, to request processor 132, a pull request for data from one or more other application services 140. The data may be requested periodically (e.g., according to a schedule defined by a user through user interface 122). To minimize an amount of data transmitted to the requesting application service 140A, request processor 132 may cache data previously retrieved from the one or more other application services 140 and provided to requesting application service 140A. If the cached data from an application service 140 matches the data retrieved from the application service 140, request processor 132 need not provide the retrieved data to requesting application service 140A. The data retrieved from the application service 140 may be discarded to reduce an amount of data to be converted by data converter 134 into a format usable by requesting application service 140A. In some embodiments, if the cached data from the application service 140 and the retrieved data from application service 140 partially matches (e.g., the retrieved data includes some data entries that are also included in the cached data and some data entries that are not included in the cached data), request processor 132 can modify the retrieved data by removing the matching data from the retrieved data set and pass the modified data to data converter 134 for processing. Caching and data set truncation may be used, for example, where an application service 140A requests transaction data periodically from one or more other application services 140 representing different transaction processing systems from which data is to be aggregated.

To satisfy a request to push data from application service 140A to one or more other application services 140, request processor 132 may receive, via a connector between connector platform 130 and application service 140A, a request from application service 140A identifying the data to be transmitted and the destination application services 140 to receive the information. In some embodiments, request processor 132 may receive the data to be transmitted with the request to push data to the one or more destination application services 140. In some embodiments, request processor 132 may receive information identifying the data to be pushed to the one or more destination application services 140 and may retrieve, from application service 140A, the identified data using data repository access information previously provided to request processor 132 in configuration information for the connector between connector platform 130 and application service 140A or included in the push data request. The identified data may be passed to data converter 134 for conversion from a format associated with application service 140A to a format usable by the one or more destination application services 140.

In some embodiments, the data set intended for a destination application service 140 may be cached at request processor 132 until the result data set is successfully transmitted to the destination application service 140. Destination application service 140 may transmit an acknowledgment message indicating that the result data set was successfully received, and upon receiving the acknowledgment message, request processor 132 may remove the result data set from the cache. If destination application service 140 transmits a negative acknowledgment indicating that the result data set was not successfully received, request processor 132 may retransmit the result data set until an acknowledgment message is received or a threshold number of unsuccessful transmission attempts have been performed. In some embodiments, request processor 132 need not explicitly receive a negative acknowledgment message in order to assume that a transmission of the result data set has failed. If request processor 132 does not receive any message from destination application service 140 within a timeout period, request processor 132 can assume that transmission of the result data set failed and retransmit the result data set to the destination application service 140.

Data converter 134 generally receives data from a source application service 140 converts the data to a format associated with a destination application service 140 for request processor 132 to transmit to the destination application 140 and thereby satisfy a request to transmit or retrieve data received by request processor 132. As discussed in further detail herein, data converter 134 generally receives one or more data sets from one or more source application services 140 and converts the received one or more data sets to one or more intermediary data sets having a common data format. As described herein, the common data format may be a data format defined for use in an intermediate data conversion and/or processing step between receipt of data from a first service and transmission of the data to a second service. Subsequently, data converter 134 converts the one or more intermediary data sets to a result data set including the data retrieved from the source application service(s) 140 in a format usable by the destination application service 140 and provides the result data sets to request processor 132 for transmission to the destination application service 140.

By converting data sets to and from intermediary data sets to application service-specific data sets, data can be transferred between different application services without those application services needing to have detailed information about how to convert data from other application services and dedicated connectors between application services. Application services need only maintain connectors to connector platform 130 to provide data, when requested or as part of a request, to the common data platform for conversion and routing to a destination application service. The common data format used by unified connector platform 130 generally allows for the orchestration of communications between different application services by facilitating translations of data from a format used by a first application service to a format used by any other application service without the use of dedicated connectors or translation services dedicated to facilitating direct communications between groups of application services.

In some embodiments, information to convert the data formats used by each application service 140 to and from the common data format may be included in the connector modules associated with each application service 140. Data converter 140 may use the data conversion features included in the connector modules associated with each application service 140 to convert a received data set from a source application service to an intermediate data set and convert the intermediate data set to a result data set with data formatted in a format usable by the destination application service.

In some embodiments, data converter 134 can use schema mappings associated with the application services 140 to generate an intermediate data set by converting the data from a source application service from the format associated with the source application service to a common data format and generate a result data set by converting the intermediate data set from the common data format to the format associated with the destination application service 140. These schema mappings may be committed to a data repository (e.g., schema mapping repository 150) when a developer adds a connector to connector platform 130 for orchestrating communications between different application services 140 through unified connector platform 130 and may be updated as connectors between application services 140 and unified connector platform 130 are updated. The mappings may, for example, define mappings between field names in an application service-specific data format and corresponding field names in a common data format, data conversions to be performed when converting data in a field in the application service-specific data format to a corresponding field in the common data format (e.g., float-to-double or double-to-float conversions, encoding changes from the application service-specific data format to the common data format, and other data conversions that may need to be performed to generate an intermediate data set from a data set in an application service-specific format or a result data set from an intermediate data set in a common data format).

In some embodiments, the information to convert the data formats used by a specific application service 140 to and from the common data format may include versioning information corresponding to a version of an application executing on the requesting or transmitting application service 140. In an environment where multiple versions of an application are deployed concurrently, an application service 140 executing a first version of the application may consume and transmit data in a different format from a second application service 140 executing a second version of the application. To ensure that the data transmitted to any application service 140 conforms to the expected format for the receiving application service 140, connector platform 130 may maintain information identifying the version of the application deployed on each application service 140 and corresponding information linking each version of the application to a specific mapping of an application service-specific data format to the common data format. When unified connector platform 130 receives a request to perform a data transfer between a first application service 140A and a second application service 140B, data converter 134 can use the version information associated with applications executing on each of first application service 140A and second application service 140B to select the appropriate version of the data mappings to use in converting the requested data from a format usable by the first application service 140A to a format usable by the second application service 140B.

For example, suppose that application service 140A is a transaction processing system and application service 140B is a transaction tax calculator system, and application service 140A requests, through unified connector platform 130, a calculation of an amount of tax to apply to a transaction. Application service 140A transmits transaction line item information to unified connector platform 130 in a first format (e.g., an XML file, other parseable text file, a data object, etc.). Unified connector platform converts the received information from the first format to a common data format using a mapping between, for example, field names defined for the first format to field names defined for the common data format. For example, suppose that each transaction line item in the first format includes fields named txnLineNumber, txnLineDescription, and txnLineAmount, and the mapping between the first format to the common data format specifies that txnLineNumber maps to a field named lineNo, txnLineDescription maps to a field named lineDescription, and txnLineAmount maps to a field named lineTotal having a data type of float. Using the mapping defined between the first format associated with application service 140A and the common data format, data converter 134 can generate an intermediate data set, for example, as a database table or parseable data file with the data from application service 140A in the appropriate fields in the common data format. More specifically, suppose that data converter receives the following data set from application service 140A:

<transaction>
  <transactionLine>
    <txnLineNumber>1</txnLineNumber>
    <txnLineDescription>Widget PN 123456</txnLineDescription>
    <txnLineAmount>273.95</txnLineAmount>
  </transactionLine>
  <transactionLine>
    <txnLineNumber>2</txnLineNumber>
    <txnLineDescription>Widget PN 234567</txnLineDescription>
    <txnLineAmount>749.95</txnLineAmount>
  </transactionLine>
</transaction>

Using the mapping established for converting the data set from the first format associated with application service 140A to the common data format, data converter may generate the following intermediary data set:

<transaction>
  <transactionLine>
    <lineNo>1</lineNo>
    <lineDescription>Widget PN 123456</lineDescription>
    <lineTotal>273.95</lineTotal>
  </transactionLine>
  <transactionLine>
    <lineNo>2</lineNo>
    <lineDescription>Widget PN 234567</lineDescription>

```
        <lineTotal>749.95</lineTotal>
    </transactionLine>
</transaction>
```

The mapping between an application service-specific format and the common data format may be used both for converting data from an application service-specific format to the common data format and for converting data from the common data format to an application service-specific format.

In some embodiments, data converter 134 may aggregate intermediate data sets generated from retrieved data sets obtained from a plurality of source application services 140 and convert the aggregated intermediate data set into a single result data set. Intermediate data sets may be aggregated, for example, when a requesting (destination) application service 140 requests similar or identical data sets from a plurality of source application services 140. For example, if an application service 140A hosting a tax preparation or accounting application service requests transaction data from one or more application services 140 hosting transaction processing services, each targeted transaction processing service identified in the request may return a transaction data set in a format associated with that transaction processing service. Data converter 134 may generate an intermediate data set for each transaction data set by converting each transaction data set from the format associated with a specific transaction processing service to a common data format. Because each intermediate data set, after conversion, may be formatted in the same data format, the intermediate data sets may be aggregated into a single intermediate data set including transaction data from each of the targeted transaction processing services. Data converter 134 may proceed to convert the aggregated intermediate data set to a result data set formatted for use by the requesting application service 140A.

Generally, unified connector platform 130 may configure and push data upstream to be used by a requesting application service such that unified connector platform 130 may provide more than a minimum, common, data set used by each of the application services 140 that communicate through unified connector platform 130. For example, in a scenario where a plurality of requesting application services are transaction processing systems and a source application service is a transaction rule provider, a specific requesting transaction processing system may request or otherwise consume transaction rules from a transaction rule provider aperiodically (e.g., when a transaction is processed) or periodically (e.g., requesting or receiving updated rules on a regular basis). The transaction processing systems may request or consume transaction rules based on any desired granularity or specificity, such as rules based on a postal code (e.g., ZIP code), rules based on an extended postal code (e.g., ZIP+4), rules based on addresses or address ranges, rules based on different classes of items included in a transactions, and so on. In response, unified connector platform 130 may maintain information about how each of the transaction processing systems requests or consumes transaction rules and orchestrate the transfer of the applicable rules from the transaction rule provider to each of the transaction processing systems in a format usable by each of the transaction rule providers, as discussed above.

In some embodiments, a transaction processing system may include a plurality of application services 140 communicating via unified connector platform 130 to process a transaction. For example, a transaction may be partially processed by a shopping cart application service, an invoicing application service, and an accounting application service. To ensure that the correct data is used across each of these services, unified connector platform 130 may ensure that transaction data is transferred across each of these application services so that transaction rules are applied correctly (e.g., taxes are calculated for a transaction once using the appropriate transaction rules for the location and contents of the transaction). Further, unified connector platform 130 may use information from each of the one or more application services to check for consistency in calculations performed by each of these platforms.

Application services 140 are representative of one or more application services that can communicate with each other (e.g., request data from and transmit data to each other) via unified connector platform 130. By communicating with other application services through unified connector platform 130, application services 140 may communicate with each other without having to establish and maintain dedicated connections and data conversion services between each pairing of application services 140. Each application service 140 generally includes an application server 142 and an application data store 144. Application server 142A generally initiates communications with a second application server 142B in a second application service 140B by transmitting a request to unified connector platform 130 using the connector established for communications between unified the connector platform 130 and first application service 140A. These communications, as discussed, may include requests to retrieve data from an application service 140 or transmit data to an application service 140. To initiate a request to transmit data to a second application service 140B, application server 142A at a first application service 140A can query its associated application data store 144A and retrieve the data to be transmitted to the second application service 140B. The retrieved data may be provided to unified connector platform 130 which, as discussed above, converts the retrieved data to a format usable by the second application service 140B and transmits the converted data to the second application service 140B. To initiate a request to retrieve data from first application service 140A, second application server 142B at second application service 140B can transmit the request to unified connector platform 130 identifying the data to be retrieved and the application services from which the data is to be retrieved (e.g., first application service 140A). In response, second application service 140B receives, from unified connector platform 130, a data set including the identified data in a format usable by second application service 140B.

In some embodiments, application services 140 may be representative of applications or services used in e-commerce platforms. These application services may include accounting tool platforms (e.g., invoicing software, shipping software, etc.), accounting systems, tax engines, other services that may be used in e-commerce systems, and/or a combination thereof.

Schema mapping repository 150 generally provides a storage repository for schema mappings between a data format associated with an application service 140 and a common data format used by the connector platform to process data requests from an application service 140. Schema mapping repository 150 may be structured as a relational database, non-relational database, flat file store, or any other appropriate data storage system that may be used to store the schema mappings between application service-specific data formats and the common data format.

Figure 2:
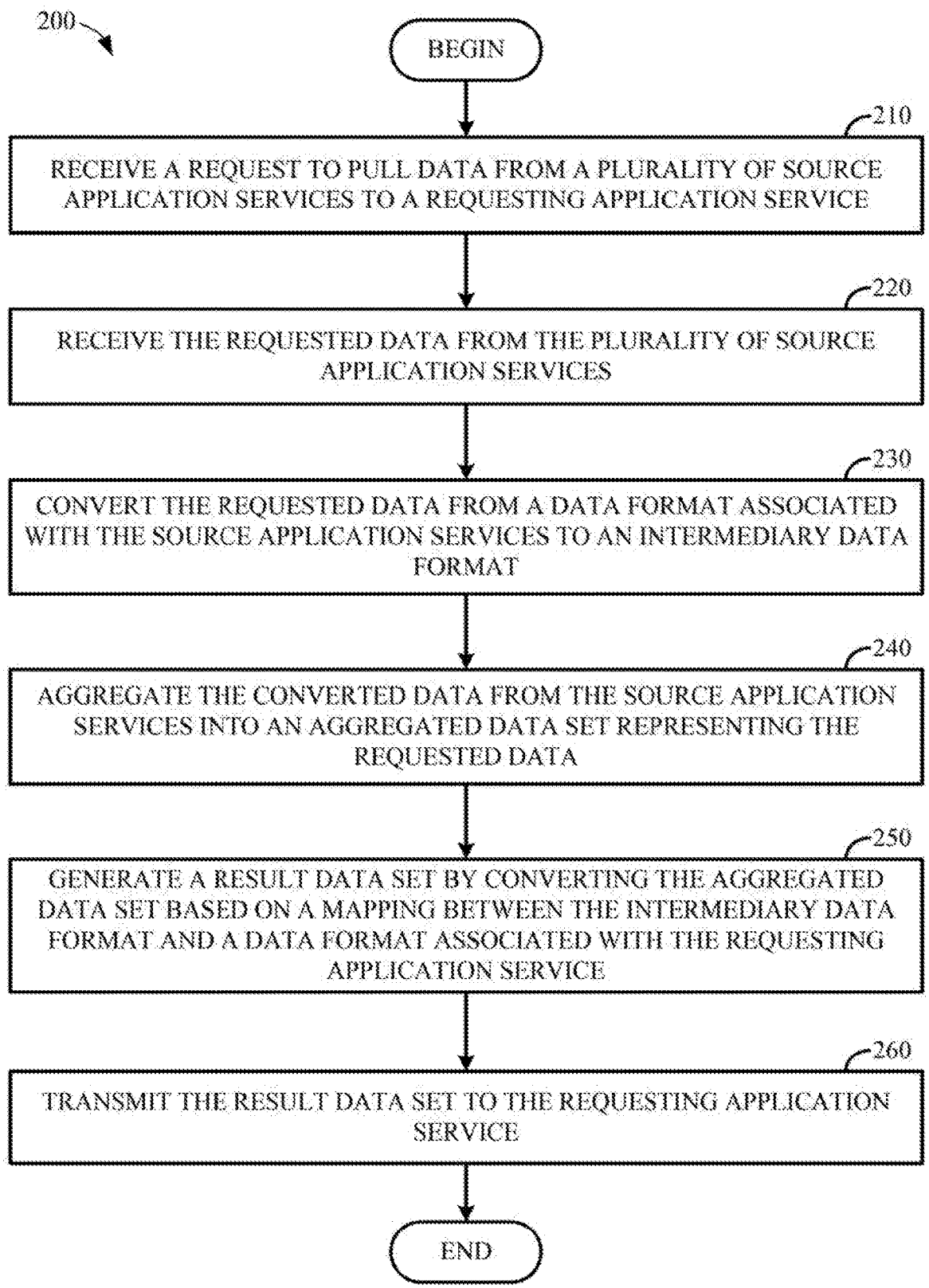
FIG. 2 illustrates example operations for orchestrating a request initiated by a first application service to pull data from a second application service via a unified connector platform.

Example Computer-Implemented Method for Orchestrating Communications Between Application Services Through a Unified Connector Platform FIG. 2 illustrates example operations 200 for orchestrating requests to pull data from multiple application services through a unified connector platform, according to an embodiment of the present disclosure.

As illustrated, operations 200 begin at block 210, where a system receives a request to pull data from a plurality of source application services to a requesting application service. The request to pull data may include information identifying the requested data and the source application services from which the requested data is to be pulled. In some embodiments, the information identifying the requested data may include parameters defining the set of data to be returned from the target application services. In some embodiments, the information identifying the requested data may indicate that the requesting application service is requesting all data from the plurality of source application services or a specific data point to be calculated by a source application service.

At block 220, the system receives the requested data from the plurality of source application services. Generally, to receive the requested data from the one or more source application services, the system may invoke one or more functions on the source application services through the connector between the unified connector platform and the plurality of source application services. In response, the system may receive the requested data as one or more data sets from the plurality of source application services, and each of the data sets may be formatted according to a format associated with the target application service from which a data set was received.

At block 230, the system converts the requested data from a data format associated with the plurality of source application services to an intermediary data format. The intermediary data format may be a common data format used by the connector platform to process data (e.g., aggregate data, determine whether requested data has already been provided to the requesting system, etc.) prior to converting the processed data from the intermediary data format to a format usable by the requesting application service. In some embodiments, the system can convert the requested data from a data format associated with the plurality of source application services to an intermediary data format based on a mapping between field names and data types in the data format associated with a source application service to corresponding field names and data types in the common data format, as discussed above.

At block 240, the system aggregates the converted data from the plurality of source application services into an aggregated data set representing the requested data. The aggregated data set generally includes the data from the one or more target systems, formatted in the common data format rather than the data formats associated with the plurality of source application services from which the data was retrieved.

At block 250, the system generates a result data set by converting the aggregated data set based on a mapping between the intermediary data format and a data format associated with the requesting application service. As discussed above, the result data set may be generated according to a mapping from field names and data types in the intermediary data format to corresponding field names and data types in the data format associated with the requesting application service.

At block 260, the system transmits the result data set to the requesting system.

While FIG. 2 illustrates operations performed with respect to orchestrating a request to pull data from a plurality of source application services, it should be recognized that similar operations may be performed for orchestrating a request to pull data from a single source application service. In such a case, aggregation of the converted data sets from the source application services discussed with respect to block 240 above need not be performed, and the result data set may be generated by converting the requested data in the intermediary data format to the data format associated with requesting application service.

Figure 3:
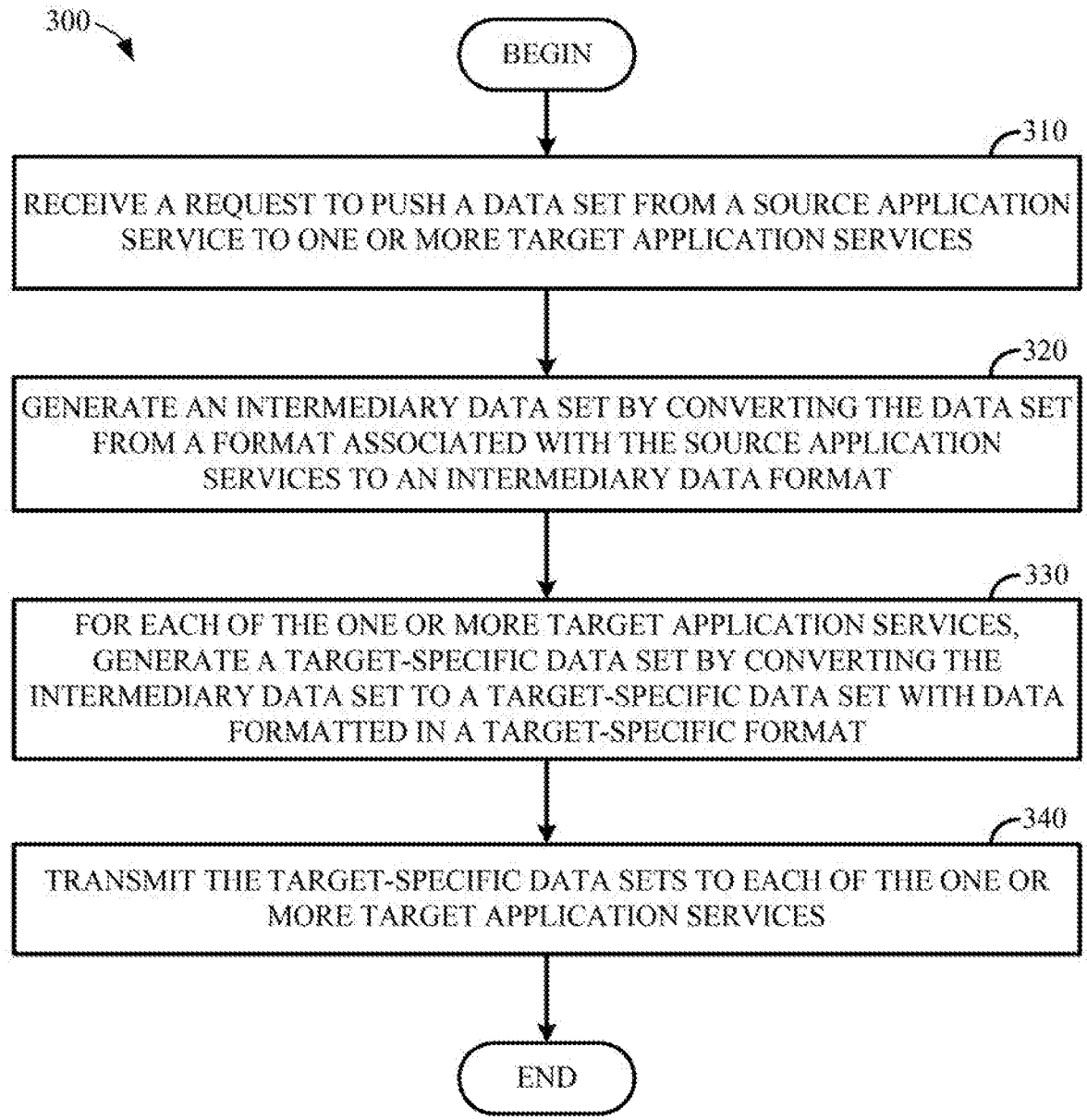
FIG. 3 illustrates example operations for orchestrating a request initiated by a first application service to push data to a second application service via a unified connector platform.

FIG. 3 illustrates example operations 300 for orchestrating data push operations from a source application service to a target application service via a unified connector platform, according to an embodiment.

As illustrated, operations 300 begin at block 310, where a system receives a request to push a data set from a source application service to one or more target application services. The request may be received, for example, via a connector between the unified connector platform and the source system, and the request generally identifies a data set to be transmitted to the one or more target application services and the target application services that are to receive the data set. In some embodiments, the request may include the data to be pushed to the one or more target application services. In some embodiments, the request may include information identifying a location of the data to be pushed to the one or more target application services and, if needed, authentication information for accessing the location at which the data is stored. Based on the information identifying a location of the data to be pushed, the system can obtain the data in a format associated with the source application service.

At block 320, the system generates an intermediary data set by converting the identified data set from a format associated with the source application service to an intermediary data format. As discussed, the intermediary data format may be a common data format used by the system to preprocess the data set received from the source application service prior to providing the requested data to the one or more target application services. In some embodiments, the intermediary data set may be generated by applying a mapping between data fields and types defined for the data format associated with the source application service and corresponding data fields and types defined for the intermediary data format.

At block 330, the system generates a target-specific data set for each of the one or more target application services by converting the intermediary data set to a target-specific data set with data formatted in a target-specific format. In some embodiments, the target-specific data set may be generated from the intermediary data set based on a mapping between the intermediary data format and a target-specific format. In some embodiments, where multiple source application services are pushing data to the same target application services concurrently, the system can aggregate the data intended for the same target application services into a single data set, formatted in the intermediary data format, and generate a target-specific data set from the aggregated data set.

At block 340, the system pushes the target-specific data sets to each of the one or more target systems. In some embodiments, the system may use an acknowledgement/ negative acknowledgment and/or a response timeout mechanism to ensure that the target application service receive the target-specific data sets. An acknowledgment closes a push request with respect to the source application service and the target application service from which the acknowledgment was received, while a negative acknowledgment or timeout generally prompts a retransmission of the target-specific data set.

Figure 4A:
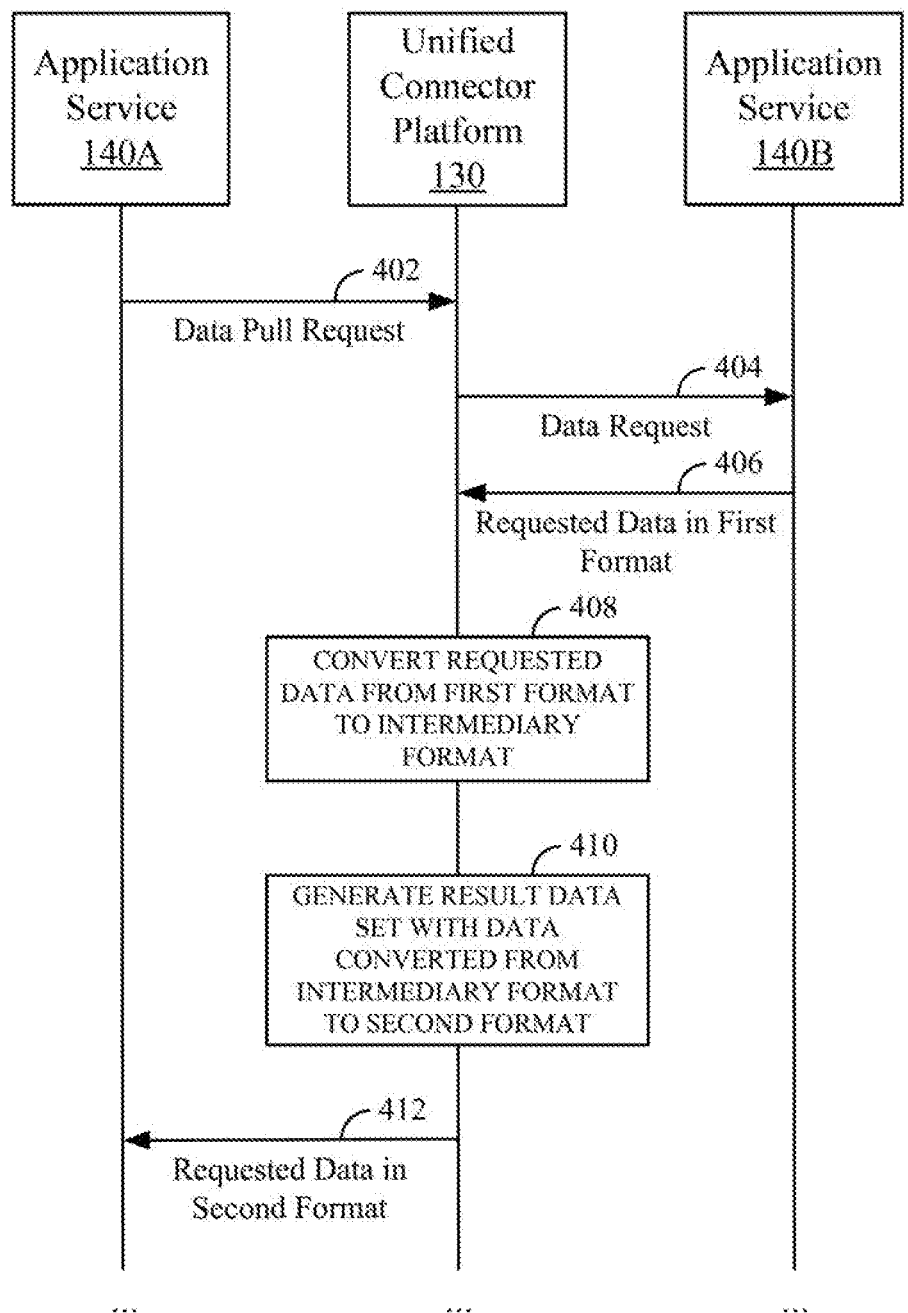
FIGS. 4A and 4B illustrate examples of messages exchanged between a first application service, a second application service, and a unified connector platform to orchestrate data transfer operations between the first application service and the second application service.

FIG. 4A illustrates messages exchanged between a first application service 140A, unified connector platform 130, and a second application service 140B to process a data pull request initiated by first application service 140A. As illustrated, to initiate a data pull request, first application service 140A transmits a data pull request 402 to unified connector platform. As discussed above, data pull request 402 generally includes information identifying the second application service 140B and the data to be retrieved from second application service 140B.

Unified connector platform receives data pull request 402 from first application service 140A and parses the information included in data pull request 402 to identify the second application service 140B from which data is to be retrieved. Based on the identification of the second application service 140B, unified connector platform 130 transmits data request 404 to second application service 140B. Data request 404 may be transmitted by invoking a function exposed by an API associated with second application service 140B through a connector between unified connector platform 130 and second application service 140B. In response, unified connector platform receives the requested data 406 in a first format (i.e., a format associated with second application service 140B).

At block 408, unified connector platform converts the requested data from the first format to an intermediary format, or a common data format used by unified connector platform 130 to facilitate data transfer operations between different application services 140 through unified connector platform 130. The use of conversion to and from the common data format allows for communications to be performed between application services 140 without needing to use dedicated connectors and translation operations for each set of application services 140 that may communicate with each other. As discussed above, the conversion of the requested data from the first format to the intermediary format may be performed by applying a mapping between data fields and data types specified for the first format to corresponding data fields and data types specified for the intermediary data format. At block 410, unified connector platform generates a result data set including the requested data. The result data set may be generated by converting the data in the intermediary data format to a second format associated with first application service 140A. The conversion of data from the intermediary data format to the second format may be performed by applying a mapping between data fields and data types specified for the intermediary data format to corresponding data fields and data types specified for the second format.

After generating the result data set at block 410, unified connector platform 130 transmits message 412 including the requested data in a second format to first application service 140A. As discussed above, additional messages may be transmitted between first application service 140A and unified connector platform 130 to confirm receipt of the requested data and/or initiate retransmissions of the requested data.

Figure 4B:
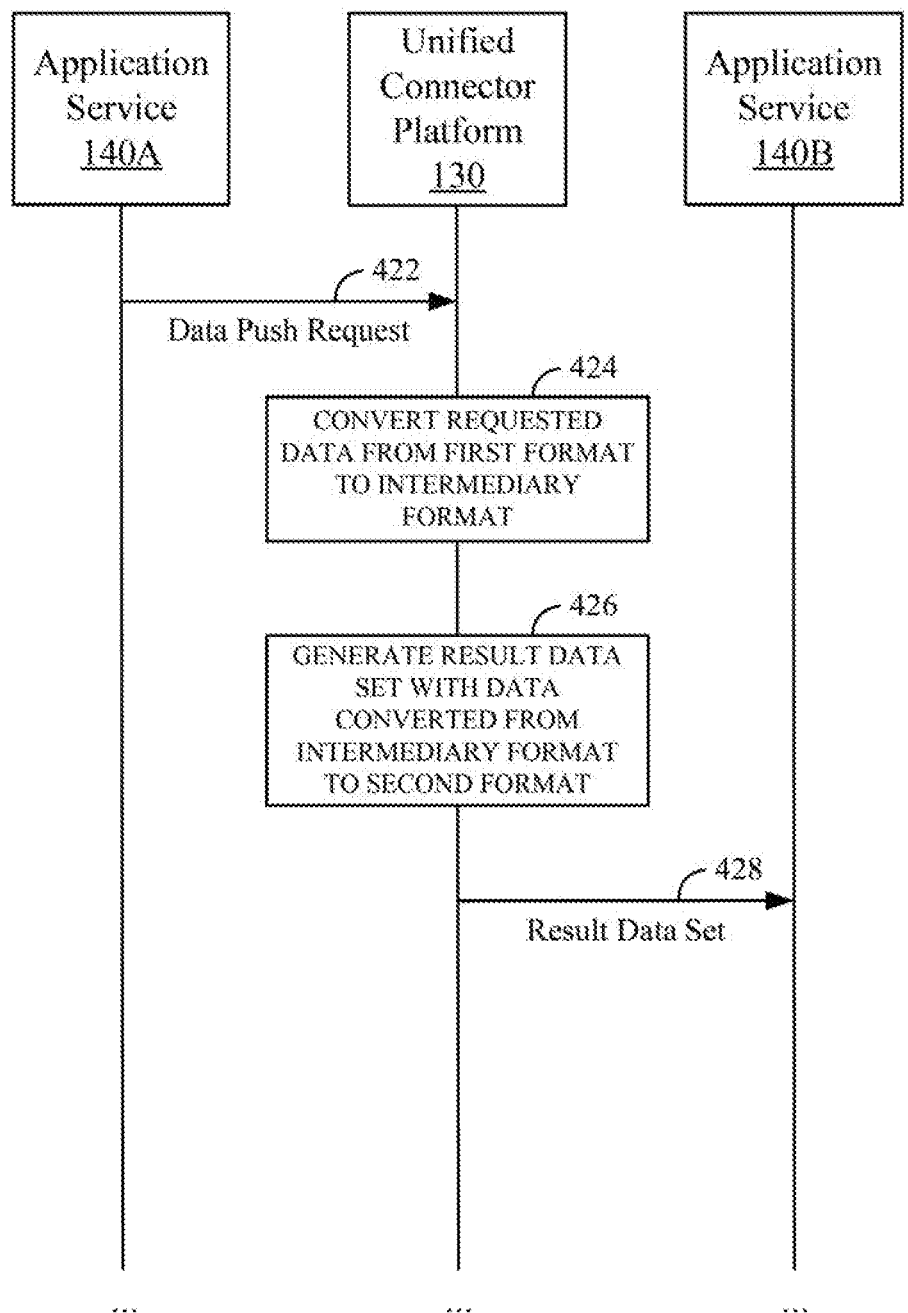

FIG. 4B illustrates messages exchanged between a first application service 140A, unified connector platform 130, and a second application service 140B to process data push requests initiated by first application service 140A. as illustrated, a request to push data from first application service 140A to second application service 140B may begin with first application service 140A transmitting a data push request 422 to unified connector platform 130 via a connector between application service 140A and unified connector platform 130. Data push request 422 may identify the data to be pushed and second application service 140B as the destination of the pushed data. In some embodiments, data push request 420 may include the data to be pushed to second application service 140B; in other embodiments, data push request 420 may include information identifying a location at which unified connector platform 130 can retrieve the data to be pushed to second application service 140B.

At block 424, unified connector platform 130 converts the received data from a first format associated with the first application service 140A to an intermediary data format. As discussed, the intermediary data format may be a data format used by unified connector platform 130 to pre-process data before transmitting data to a second application service 140B. At block 426, unified connector platform 130 generates a result data set with the requested data converted from the intermediary data format to a second format. The second format may be a data format associated with second application service 140B, and, as discussed, the result data set may be generated by mapping field names and formats defined for the intermediary data format to corresponding field names and formats in the second format.

After generating the result data set at block 426, unified connector platform transmits the result data set to second application service 140B in message 428. As discussed above, additional messages may be transmitted between second application service 140B and unified connector platform 130 to confirm receipt of the pushed data and/or initiate retransmissions of the pushed data.

Figure 5:
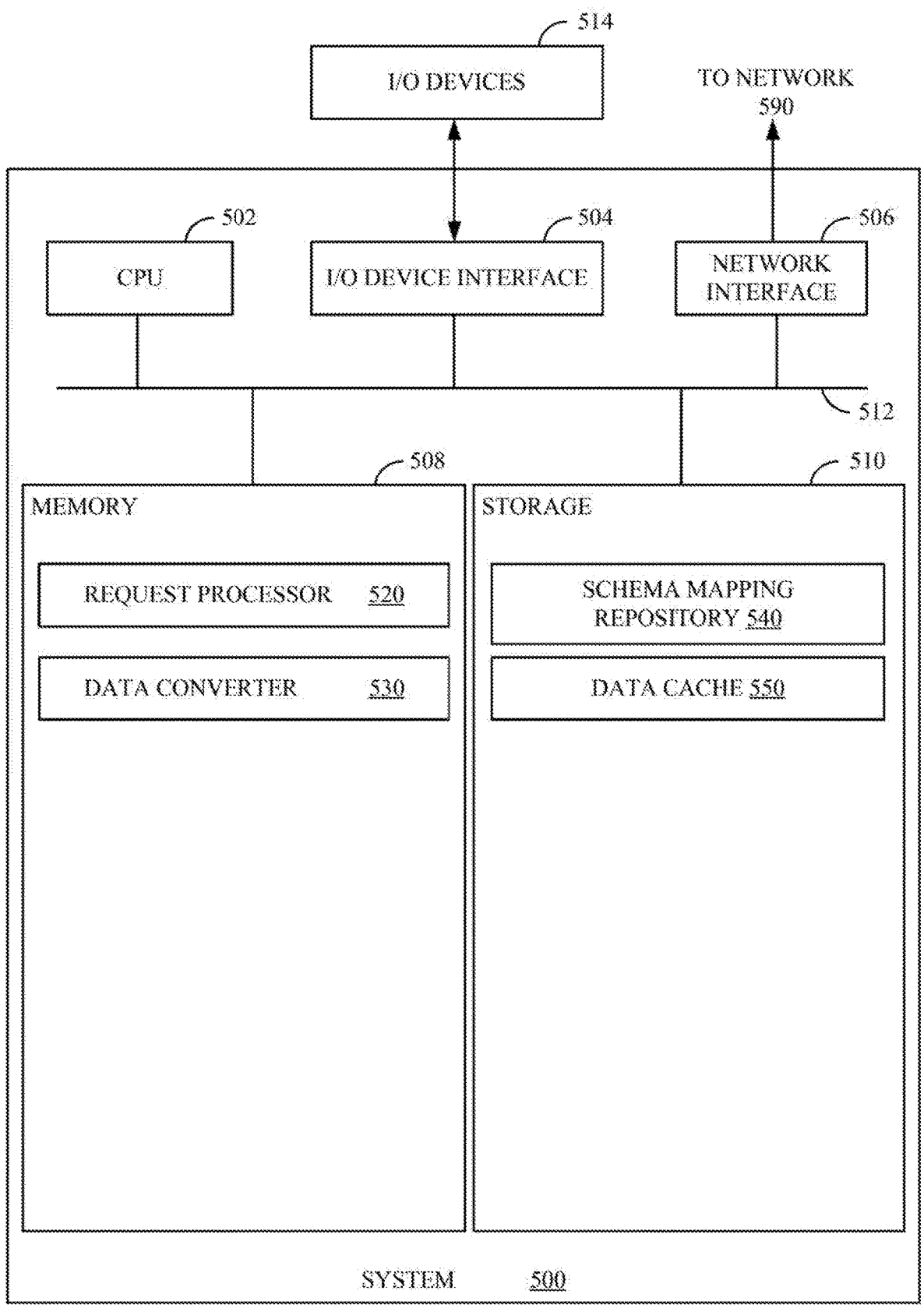
FIG. 5 illustrates an example computing system with which embodiments of the present disclosure may be implemented.

Example System for Orchestrating Communications Between Application Services Through a Unified Connector Platform FIG. 5 illustrates an example system 500 for orchestrating communications between application services through a unified connector platform, according to embodiments of the present disclosure. For example, system 500 may be representative of connector platform 130 illustrated in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 400, network interface 506 through which system 500 is connected to network 590 (which may be a local network, an intranet, the internet, or any other group of computing devices communicatively connected to each other), a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a request processor 520 and a data converter 530. Request processor 520 generally receives data retrieval (pull) and transmission (push) requests from one or more application services (e.g., application services 140 illustrated in FIG. 1) via network interface 506 using connectors between system 500 and the one or more application services. These connectors, as discussed, generally expose API functions to invoke data transfer operations between an application service and the system 500 so that changes to the operations of a specific application service can be addressed by modifying the connector between the specific application service and system 500 without needing to modify other connectors between system 500 and other application services. Request processor 520 generally retrieves the requested data from the one or more application services from which the data is requested and provides the requested data to data converter 530 for processing. The result data set generated by data converter 530 may be provided to request processor 520, which transmits the result data set to the requesting application service(s) for data retrieval operations or the target application service(s) for data transfer operations.

Data converter 530 generally uses mappings between a common, intermediary data format and data formats associated with each of the application services to generate result data sets in the data format associated with a target application service. The result data sets may be generated from one or more data sets obtained from source application services in data formats associated with the source application services. To generate the result data sets, the data sets obtained from the source application services may be converted to an intermediary, common data format based on a mapping between the data formats associated with the source application services and the intermediary data format. Data converter 530 may pre-process the converted data sets to, for example, aggregate data sets from different source application services into a single data set, remove data that has been previously provided to the target application services, and the like. Data converter 530 generally converts the data sets in the intermediary format (whether pre-processed or not) to a result data set formatted in a data format associated with the target application service and provides the result data set to request processor for transmission to the target application service.

In some embodiments, data converter 530 may additionally maintain a temporary cache in memory 508 to store result data sets and aggregated data sets for use in retransmitting result data sets to an application service 140 in response to a received negative acknowledgment or a detected timeout event and in reducing the size of data sets to be processed (e.g., converted to an intermediary data format from a first data format or converted to a second data format from the intermediary data format), as discussed above.

Storage 510, as illustrated, includes a schema mapping repository 540. Schema mapping repository 540 generally provides a searchable repository in which mappings between application-specific data formats and the intermediary, common data format are stored. Data converter 530 can retrieve the appropriate mappings and convert data sets from an application-specific format to the intermediary format, and vice-versa, as needed. Storage 510 may additionally include a data cache 550 that stores result data sets and aggregated data sets for use in retransmitting result data sets to an application service 140 in response to a received negative acknowledgment or a detected timeout event and in reducing the size of data sets to be processed (e.g., converted to an intermediary data format from a first data format or converted to a second data format from the intermediary data format), as discussed above.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for orchestrating data transfer operations between multiple computing systems using distinct data formats through an intermediary platform, comprising:
   receiving, from a first application service, a request to pull a specified data set from a second application service through a unified connector platform;
   identifying, based on associations between content of data sets and functions exposed by the second application service, a function to invoke at the second application service to pull the specified data set from the second application service;
   in response to receiving the request, invoking the identified function;
   obtaining, from the second application service, the specified data set, the specified data set being formatted according to a format associated with the second application service and generated in response to invoking the identified function;
   generating an intermediary data set by converting the specified data set from the format associated with the second application service to a common data format;
   generating a result data set by converting the intermediary data set from the common data format to a format usable by the first application service; and
   transmitting, to the first application service, the result data set containing the specified data set in the format usable by the first application service.

2. The method of claim 1, wherein:
the request to pull the specified data set further includes a request to pull the specified data set from a plurality of third application services; and
the method further comprises:
  obtaining the specified data set from the plurality of third application services,
  generating second intermediary data sets by converting the obtained data sets from the plurality of third application services from formats associated with the plurality of third application services to the common data format, and wherein generating the result data set comprises:
    combining the intermediary data set and the second intermediary data sets into an aggregated intermediary data set; and
    converting the aggregated intermediary data set to a result data set containing the data sets obtained from the second application service and plurality of third application services in the format associated with the first application service.

3. The method of claim 1, wherein converting the specified data set from the format associated with the second application service from which the specified data set was obtained to a common data format comprises applying a mapping from field names defined for the format associated with the second application service to corresponding field names defined for the common data format.

4. The method of claim 3, wherein the mapping from the format associated with the second application service to the common data format comprises a mapping between a data format associated with a version of an application deployed on the second application service.

5. The method of claim 1, wherein converting the intermediary data set to the result data set comprises applying a mapping from the common data format to an expected data format for data to be consumed by the first application service.

6. The method of claim 1, further comprising:
receiving, from the first application service, a push request identifying data to transmit asynchronously to one or more third application services through the unified connector platform;
converting the identified data from a first format associated with the first application service to an intermediate format; and
for each of the one or more third application services:
  generating a service-specific data set by converting the identified data in the intermediate format to a format associated with the third application service, and
  transmitting the service-specific data set to the third application service through a connector between the unified connector platform and the third application service.

7. The method of claim 6, wherein the push request includes scheduling information indicating a periodicity at which the request is to be executed.

8. The method of claim 7, further comprising:
storing the identified data in a cache;
receiving, according to the scheduling information, a second instance of the push request identifying second data to transmit to a third application service;
determining that one or more differences exist between the identified data and the identified second data; and
transmitting the one or more differences to the third application service.

9. The method of claim 1, wherein the request to pull the specified data set from the second application service includes scheduling information indicating a periodicity at which the request is to be executed.

10. The method of claim 9, further comprising:
storing the result data set in a cache;
receiving an indication from the first application service that the result data set associated with the first application service was successfully received; and
in response to the received indication, removing the result data set associated with the first application service from the cache.

11. The method of claim 1, wherein the first application service and the second application service comprise elements of an e-commerce platform.

12. A system, comprising: a processor; and a
memory having instructions stored thereon which, when executed by the processor, performs an operation for orchestrating data transfer operations between multiple computing systems using distinct data formats through an intermediary platform, the operation comprising:
receiving, from a first application service, a request to pull a specified data set from a second application service through a unified connector platform;
identifying, based on associations between content of data sets and functions exposed by the second application service, a function to invoke at the second application service to pull the specified data set from the second application service;
in response to receiving the request, invoking the identified function;
obtaining, from the second application service, the specified data set, the specified data set being formatted according to a format associated with the second application service and generated in response to invoking the identified function;
generating an intermediary data set by converting the specified data set from the format associated with the second application service to a common data format;
generating a result data set by converting the intermediary data set from the common data format to a format usable by the first application service; and
transmitting, to the first application service, the result data set containing the specified data set in the format usable by the first application service.

13. The system of claim 12, wherein:
the request to pull the specified data set further includes a request to pull the specified data set from a plurality of third application services; and
the operation further comprises:
  obtaining the specified data set from the plurality of third application services,
  generating second intermediary data sets by converting the obtained data sets from the plurality of third application services from formats associated with the plurality of third application services to the common data format, and wherein generating the result data set comprises:
    combining the intermediary data set and the second intermediary data sets into an aggregated intermediary data set; and
    converting the aggregated intermediary data set to a result data set containing the data sets obtained from the second application service and plurality of third application services in the format associated with the first application service.

14. The system of claim 12, wherein converting the obtained data set from the format associated with the second application service from which the specified data set was obtained to a common data format comprises applying a mapping from field names defined for the format associated with the second application service to corresponding field names defined for the common data format, and wherein the mapping from the format associated with the second application service to the common data format comprises a mapping between a data format associated with a version of an application deployed on the second application service.

15. The system of claim 12, wherein converting the intermediary data set to the result data set comprises applying a mapping from the common data format to an expected data format for data to be consumed by the first application service.

16. The system of claim 12, further comprising:
receiving, from the first application service, a push request identifying data to transmit asynchronously to one or more third application services through the unified connector platform;
converting the identified data from a first format associated with the first application service to an intermediate format; and
for each of the one or more third application services:
generating a service-specific data set by converting the identified data in the intermediate format to a format associated with the third application service, and
transmitting the service-specific data set to the third application service through a connector between the unified connector platform and the third application service.

17. The system of claim 16, wherein the push request includes scheduling information indicating a periodicity at which the request is to be executed.

18. The system of claim 17, further comprising:
storing the identified data in a cache;
receiving, according to the scheduling information, a second instance of the push request identifying second data to transmit to a third application service;
determining that one or more differences exist between the identified data and the identified second data; and
transmitting the one or more differences to the third application service.

19. The system of claim 12, wherein the request to pull the specified data set from the second application service includes scheduling information indicating a periodicity at which the request is to be executed, and wherein the operation further comprises:
storing the result data set in a cache;
receiving an indication from the first application service that the result data set associated with the first application service was successfully received; and
in response to the received indication, removing the result data set associated with the first application service from the cache.

20. A system, comprising:
a first application service;
a second application service; and
a unified connector platform service executing independently of the first and second application services, wherein the unified connector platform service is configured to perform an operation for orchestrating data transfer operations between at least the first and second application services, the operation comprising:
receiving, from a first application service, a request to pull a specified data set from a second application service through a unified connector platform;
identifying, associations between content of data sets and functions exposed by the second application service, a function to invoke at the second application service to pull the specified data set from the second application service;
in response to receiving the request, invoking the identified function;
obtaining, from the second application service, the specified data set, the specified data set being formatted according to a format associated with the second application service and generated in response to invoking the identified function;
generating an intermediary data set by converting the specified data set from the format associated with the second application service to a common data format;
generating a result data set by converting the intermediary data set from the common data format to a format usable by the first application service; and
transmitting, to the first application service, the result data set containing the specified data set in the format usable by the first application service.

\* \* \* \* \*